(12) United States Patent
Afifi et al.

(10) Patent No.: US 9,558,088 B2
(45) Date of Patent: Jan. 31, 2017

(54) USING ENVIRONMENTAL SIGNATURES FOR TEST SCHEDULING

(71) Applicant: International Business Machines Corporation, Armonk, NY (US)

(72) Inventors: Djihed Afifi, Manchester (GB); Matthew J. Jarvis, Sheffield (GB)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 14/090,962

(22) Filed: Nov. 26, 2013

(65) Prior Publication Data

US 2014/0173351 A1 Jun. 19, 2014

(30) Foreign Application Priority Data

Dec. 13, 2012 (GB) .................................. 1222454.9

(51) Int. Cl.
*G06F 11/24* (2006.01)

(52) U.S. Cl.
CPC ..................................... *G06F 11/24* (2013.01)

(58) Field of Classification Search
CPC . G06F 11/073; G06F 11/0736; G06F 11/0751; G06F 21/64; G06F 2201/83
USPC ..................................................... 714/33, 37
See application file for complete search history.

(56) References Cited

U.S. PATENT DOCUMENTS

| | | | |
|---|---|---|---|
| 7,818,594 B2 | 10/2010 | Gorbatov et al. | |
| 2002/0161544 A1* | 10/2002 | Yanosik, Jr. ......... | G05B 19/406 702/113 |
| 2005/0223250 A1 | 10/2005 | Paver | |
| 2006/0066339 A1* | 3/2006 | Rajski et al. ................. | 324/765 |
| 2009/0007120 A1 | 1/2009 | Fenger et al. | |
| 2009/0037134 A1* | 2/2009 | Kulkarni et al. ............. | 702/127 |
| 2009/0106614 A1* | 4/2009 | Desineni et al. ............ | 714/732 |

(Continued)

FOREIGN PATENT DOCUMENTS

| | | |
|---|---|---|
| EP | 1182556 A2 | 2/2002 |
| WO | 2012082349 A2 | 6/2012 |

OTHER PUBLICATIONS

IPCOM000198118D, "Method for Reducing Power Costs of an IT Environment through Weather and Power-Cost Aware Workload Scheduling," IP.com Electronic Publication, Jul. 26, 2010, Disclosed Anonymously.

*Primary Examiner* — Kamini Patel
(74) *Attorney, Agent, or Firm* — Matthew J. Bussan (57) ABSTRACT

Method and system are provided for using environmental signatures for test scheduling. The method includes: generating an environmental signature for a test including the usage of power and temperature of one or more hardware components being tested; determining an outcome score of the test; and scheduling one or more tests on hardware components based on the environmental signature and outcome score of candidate tests. Generating an environmental signature for a test may include: monitoring the usage of power by hardware components during the course of the test; monitoring the temperature of hardware components during the course of the test; generating a signature representing the power usage and temperature during the test. Determining an outcome score of the test may include determining the number of defects exposed by a test and basing the outcome score on the number of defects exposed.

19 Claims, 4 Drawing Sheets

(56) References Cited

U.S. PATENT DOCUMENTS

| | | | |
|---|---|---|---|
| 2009/0326840 A1* | 12/2009 | Gebara et al. | 702/57 |
| 2011/0107126 A1 | 5/2011 | Goodrum | |
| 2011/0161968 A1 | 6/2011 | Bash et al. | |
| 2011/0231708 A1 | 9/2011 | Lawrance et al. | |
| 2012/0005683 A1* | 1/2012 | Bower, III et al. | 718/103 |
| 2012/0260255 A1* | 10/2012 | Arnold | G06F 9/4881 718/102 |

* cited by examiner

USING ENVIRONMENTAL SIGNATURES FOR TEST SCHEDULING

FIELD OF INVENTION

This invention relates to the field of hardware testing. In particular, the invention relates to using environmental signatures for test scheduling.

BACKGROUND OF INVENTION

In testing environments, tests can often involve multiple pieces of hardware running for different periods, all of which consume variable amounts of power and output heat. While it is possible to use the manufacturer's specifications to model heat and power usage, this does not reflect accurately the behavior over a specific workload.

If the test environment is automated, tests may be scheduled which do not produce an ideal mix of temperature output and power usage, which may lead to spikes in both temperature and power usage. This may conflict with the aims of data centre management, where it is preferable to smooth both power usage and temperature output to allow for most efficient management of environmental factors and cost.

In increasingly resource constrained environments, organisations may need to make decisions about the effectiveness of tests by comparing their environmental impact versus the benefit in exposing defects.

Therefore, there is a need in the art to address the aforementioned problems.

BRIEF SUMMARY OF THE INVENTION

According to a first aspect of the present invention there is provided a method for using environmental signatures for test scheduling comprising: generating an environmental signature for a test including the usage of power and temperature of one or more hardware components being tested; determining an outcome score of the test; and scheduling one or more tests on hardware components based on the environmental signature and outcome score of candidate tests.

Generating an environmental signature for a test may include: monitoring the usage of power by one or more hardware components during the course of the test; monitoring the temperature of one or more hardware components during the course of the test; and generating a signature representing the power usage and temperature during the test. Generating a signature may include weighting the power usage and temperature based on the importance of these aspects.

Determining an outcome score of the test may include: determining the number of defects exposed by a test and basing the outcome score on the number of defects exposed; or determining a speed of execution of the test and basing the outcome score on the speed of execution.

A test may be a test of a combination of one or more hardware components and, optionally, one or more software components. The test may be a test phase including multiple tests grouped together.

The method may include providing a definition of a test including test parameters for which a test signature is generated and stored.

The method may further include updating a test signature for a test when a software component is updated to a new version.

Generating an environmental signature for a test and determining an outcome score of the test may include repeating the test multiple times and averaging the results.

In one embodiment, scheduling one or more tests on hardware components based on the environmental signature and outcome score of candidate tests may include: determining resource and/or environmental status for the scheduled time of a test; and selecting a test from multiple candidate tests optimised for the resource and environmental status.

In another embodiment, scheduling one or more tests on hardware components based on the environmental signature and outcome score of candidate tests may include: determining resource and/or environmental status for a time period before or after a test; and selecting a test that best compliments the resource and/or environmental status.

According to a second aspect of the present invention there is provided a system for using environmental signatures for test scheduling: a monitoring system for generating an environmental signature for a test including the usage of power and temperature of one or more hardware components being tested; an outcome score component for determining an outcome score of the test; and a test scheduling system for scheduling one or more tests on hardware components based on the environmental signature and outcome score of candidate tests.

The monitoring system may include: a power monitor receiver for monitoring the usage of power by one or more hardware components during the course of the test; and a temperature monitor receiver for monitoring the temperature of one or more hardware components during the course of the test; and wherein the system includes: an environment signature generating component for generating a signature representing the power usage and temperature during the test. The environment signature generating component may include weighting the power usage and temperature based on the importance of these aspects.

In one embodiment, the outcome score component for determining an outcome score of the test may include an exposed defect counter for determining the number of defects exposed by a test and basing the outcome score on the number of defects exposed. In another embodiment, the outcome score component for determining an outcome score of the test may include a timer for determining a speed of execution of the test and basing the outcome score on the speed of execution.

The system may include a signature and outcome score store for storing results of a test.

The test scheduling system may include: a resource status component for determining resource and/or environmental status for the scheduled time of a test; and a test selection component for selecting a test from multiple candidate tests optimised for the resource and environmental status. The resource status component may be for determining resource and/or environmental status for a time period before or after a test, and wherein the test selection is for selecting a test that best compliments the resource and/or environmental status.

According to a third aspect of the present invention there is provided a computer program product for using environmental signatures for test scheduling, the computer program product comprising: a computer readable storage medium readable by a processing circuit and storing instructions for execution by the processing circuit for performing a method according to the first aspect of the present invention.

According to a fourth aspect of the present invention there is provided computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to an sixth aspect of the present invention there is provided a system substantially as described with reference to the figures.

The described aspects of the invention provide the advantage of using environmental signatures of tests as a means for choosing tests to run during testing phases, and to manage the overall environmental impact of test phases.

Whilst there is art in the field of scheduling workloads based on environmental factors, the described method and system take the environmental resource usage as a method for defining test phases based on assessing defects exposed against resources used.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

DETAILED DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The described method and system use environmental signatures to manage test scheduling in order to manage the environmental resource usage of tests and test phases. The testing may be hardware testing of one or more hardware components, or combined hardware and software testing.

The described method proposes the concept of an environmental signature for a test, which is an overall measure of the power usage and temperature outputs generated by hardware components when running the test. In conjunction with information about results of the test, this signature can be used to make decisions about which tests to run to satisfy both the resource limitations of a particular test phase, and the need to achieve the test results. For example, the result of a test may be the defect exposure which a test generated during previous runs to expose defects in a code base, or may be other performance measures such as speed of execution.

In an increasingly resource constrained environment, having the ability to make decisions based on these factors improves the efficiency of the test process. As a secondary benefit, this information also allows scheduling tests based on the environmental requirements and power usage profile of the data centre environment.

An example use case for this method is in environments where both a software and hardware platform are under test, for example, a storage controller product. In this form of testing, the hardware resources involved are exclusive to a single test, so environmental factors can be measured specifically for the test which is being run.

However, other environments requiring hardware testing may also utilize the described method. The testing may be an individual test or a test phase consisting of a number of tests grouped together. The test grouping may, for example, cover specific functionality, groups of function, or tests of a certain type.

Figure 1:
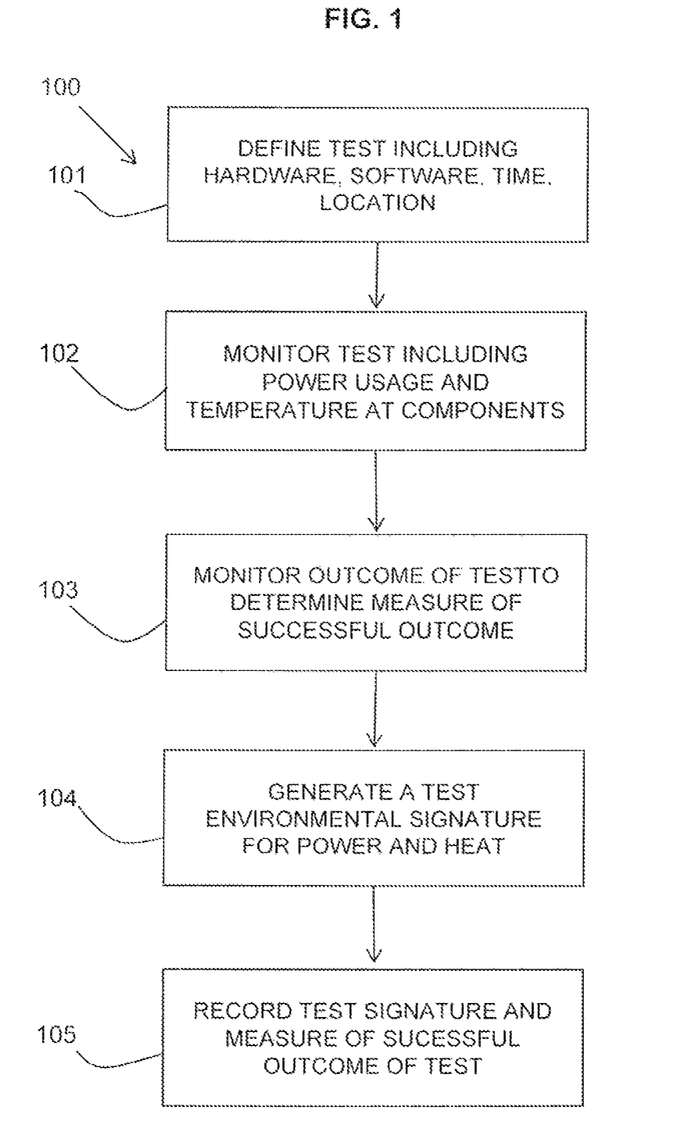
FIG. 1 is a flow diagram of an example embodiment of an aspect of a method in accordance with the present invention.

Referring to FIG. 1, a flow diagram 100 shows an example embodiment of an aspect of the described method of monitoring tests to obtain a test environmental signature.

A test may be defined 101 including the hardware components that are being tested, and, optionally, any associated software being tested, the time duration of the test, the location of the components being tested, and any other variables of the test.

The test may be carried out one or more times and monitored 102 including monitoring of the power usage of the hardware components and the temperature at the hardware components.

The outcome or result of the test may be monitored 103 to determine a measure of successful outcome of the test or "outcome score". This may be to determine the number of defects exposed, to measure a speed of execution, and/or any other performance metrics gathered during testing where the test is covering performance related functions.

A test environment signature may be generated 104 based on the power and temperature fluctuations during the test period.

A record of the test environment signature may be kept 105 along with a record of the measure of successful outcome of the test. In one embodiment, the measure of the successful outcome of the test may be combined and stored with the test environment signature.

The environmental signature may be generated and represented in a number of mathematical ways. In one example embodiment, the environmental signature may consist of two numbers, one representing heat output and one representing power usage. These two numbers may then be mathematically combined into a single number which may depend on a weighting given to either heat or power in the specific testing environment.

For example, if there is a first test 1 which produces a heat output figure of A and a temperature output figure of B, and a second test 2 which produces a heat output of B and a temperature output of A, then it may be considered that the overall signature of both tests is equivalent. However, depending on the specific environment either one of the metrics may need to be weighted by adding a factor, based on the relative importance of each metric.

The environmental signature may be expressed as:

$$\text{Heat Signature} + x(\text{Power Signature})$$

In order to generate the two signature numbers, all power and temperature sensors may be sampled before the test is run. When the test is running all sensors may be sampled at discrete intervals throughout the test. For each type of sensor measurement, a delta may be taken between the current measurement and the initial measurement and averaged to create average deltas for both power and temperature across the whole test. This averaging may be across every sensor of that type in use across all equipment used in the test.

So for example, there may be a test which uses two machines, each of which has two temperature sensors, and has power usage monitoring. During the test execution, samples may be taken 5 times for each value which yields the following results (in delta):

Machine 1, temperature sensor 1—1,2,5,3,1. Average=Sum of results/number of samples 12/5=2.4;

Machine 1, temperature sensor 2—2,3,6,4,2. Average=17/5=3.4;

Machine 1, power usage—2,3,4,3,2. Average=14/5=2.8.

Machine 2, temperature sensor 1—3,4,5,4,3. Average=19/5=3.8;

Machine 2, temperature sensor 2—2,4,6,8,4. Average=24/5=4.8;

Machine 2, power usage—3,4,6,5,4. Average=22/5=4.4.

Total Temperature Metric=2.4+3.4+3.8+4.8=14.4;

Total Power Metric=2.8+4.4=7.2.

If both power and temperature usage are considered to be equivalent in this example, then the overall environmental signature for this particular test would be:

Heat Signature+$x$(Power Signature) where $x$ is 1;

14.4+7.2=21.6.

If heat is considered to be the more important metric in an environment then x may be fractional (e.g., 0.5), alternatively, if power is considered to be more important, then x may be an integer (e.g., 2).

When a test is first run, measurements may be taken of the power usage and heat output of each piece of equipment involved in the test. This is achieved by first taking measurements in a 'cold' state, before any workload is running, and then measuring again during the entire run of the test workload. The measurements may be carried out at regular intervals or continuously. Different components may run for different periods during the test.

Power monitoring may be achieved using network controllable Power Distribution Units (PDUs), which allow the power usage of each piece of equipment plugged into them to be tracked. This information may be accessible using a Simple Network Management Protocol (SNMP) over a network connection to the PDU.

Temperature may be accurately recorded using Internet Protocol based temperature sensors which can again be automatically queried using SNMP or similar methods.

Temperature monitoring may be carried out in two ways. Firstly, each piece of hardware usually has a number of embedded sensors built into the motherboard which can be accessed in software to check temperature around components such as CPU and memory. Secondly, external network attached sensors may be added at strategic points around the hardware, which connect back to a central controller. The controller may then be polled, using whichever method it understands but generally this is achieved using the SNMP protocol accessed using tools such as snmpget on the Linux operating system.

These measurements may be used to generate an overall environmental signature of the test, which may be stored in the test scheduling system and used in future iterations as an input to a scheduling algorithm.

An environmental signature may only apply to the exact combination of hardware used in that specific test, so if a hardware configuration changes, then a new environmental signature may be required to be generated.

It is possible that the actual power and heat consumed by a test may vary depending on the software versions used, for example, if there were changes in the power management software of the storage controller. Different test signatures may be provided for different software versions used in the test. Alternatively, measurements from each new test run may be used as a replacement environmental signature to be used as input for the next set of scheduling decisions.

Figure 2:
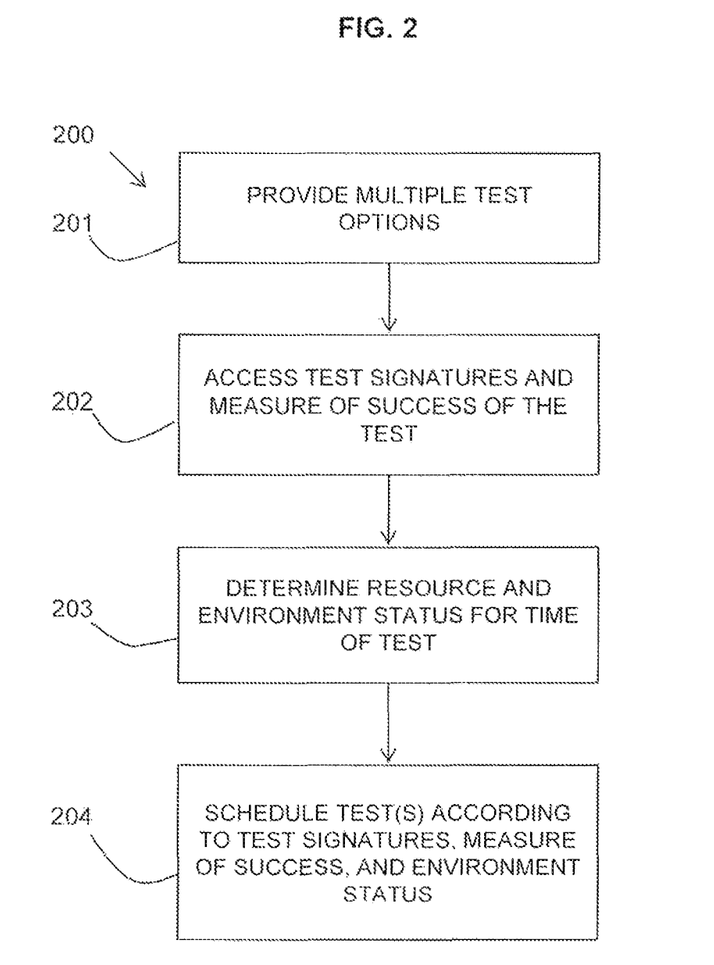
FIG. 2 is a flow diagram of an example embodiment of an aspect of a method in accordance with the present invention.

Referring to FIG. 2, a flow diagram 200 shows an example embodiment of an aspect of the described method of scheduling tests based on test environmental signatures.

Multiple test options may be provided 201 at a scheduling system. An environmental test signature for each test together the measure of success of the test are accessed 202.

Resource and/or environment status may be determined 203 for the scheduled time of the test, and, optionally, for time periods before and after the test. For example, this may include details of other uses of the resources, power availability, low cost power times, high cost power times, etc.

Test may then be scheduled 204 according to the test signature, measure of success of the test, and resource and environmental status. This may be balanced by an algorithm with optional manual input.

One embodiment of the described method may assess the relative merit of running one test over another in a resource constrained environment. In the table shown below, three tests are provided which cover the same functionality within a test project. Each has exposed defects on previous runs, and the higher resource signature equates to the test which consumes the most resources. In a resource constrained environment, it is not practical to use the power or heat to run all three, so the environmental signature provides the ability to decide which test to run based on the amount of resources consumed versus relative effectiveness at exposing defects. As such, it is possible to directly compare defects exposed per watt of energy usage.

| Test | Defects exposed | Environmental Signature |
| --- | --- | --- |
| Test One | 6 | 8 |
| Test Two | 4 | 6 |
| Test Three | 3 | 2 |

In other embodiments, the environmental signature may be used in scheduling in a variety of ways, for example:
1. Where a test with a high environmental signature derived from a high temperature output has been scheduled into equipment based in one area of a data centre, the scheduler may then choose to schedule tests with a lower environmental signature into that area afterwards in order to reduce the likelihood of a hot spot developing.
2. For a single time period, the scheduler may only schedule a certain number of tests with a high environmental signature in order to keep the overall temperature level lower.
3. Tests with a high environmental signature, derived from high power usage, may be scheduled at time periods when cheaper power is available.

The environmental signature concept thus provides a method of scheduling tests based on environmental factors, allowing for more effective management of environmental resources, data centre environments and power usage patterns.

Figure 3:
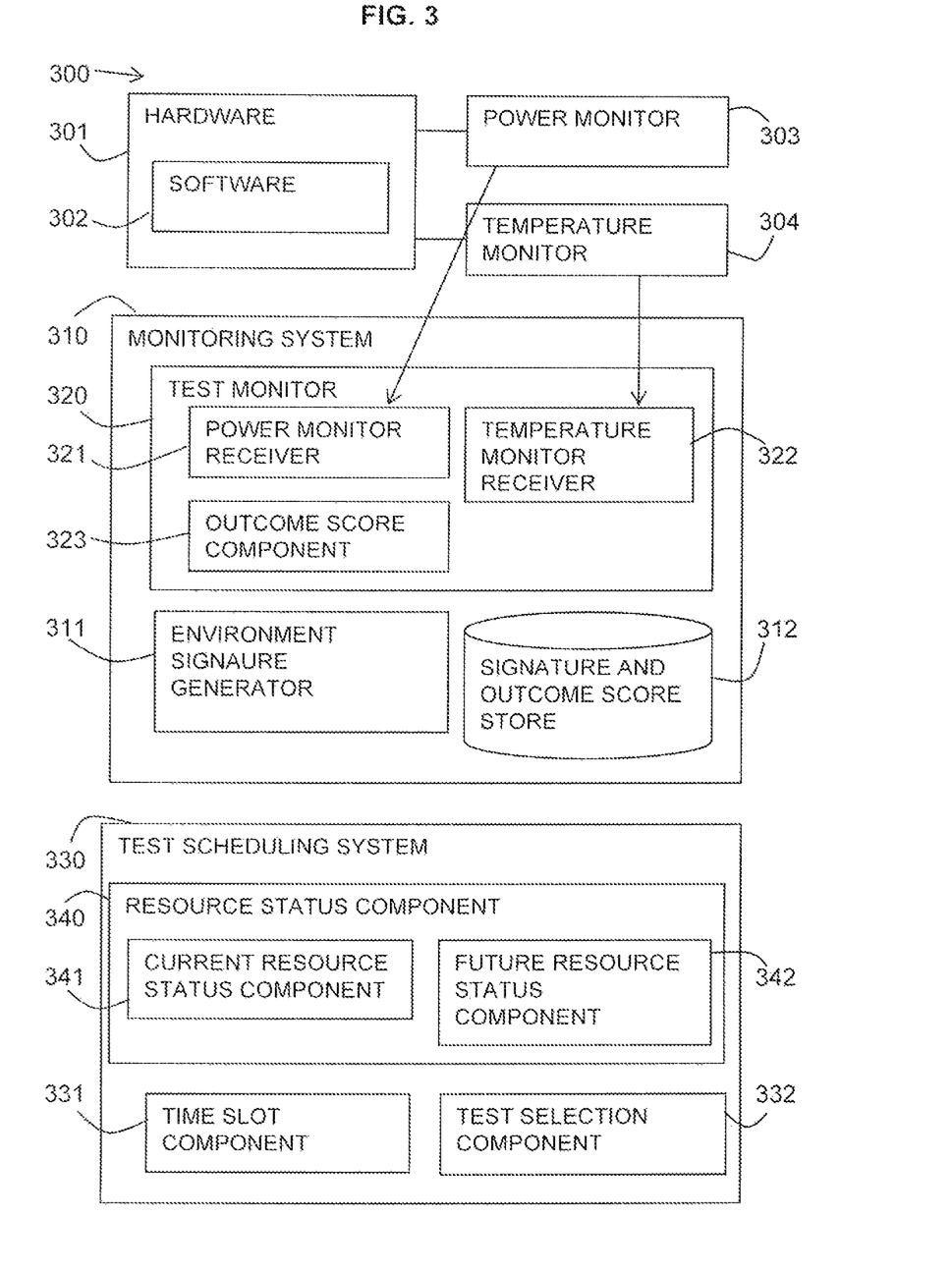
FIG. 3 is block diagram of an example embodiment of a system in accordance with the present invention.

Referring to FIG. 3, a block diagram shows an example embodiment of the described system 300.

One ore more hardware components 301 may be used in a test, optionally, dependent on associated software 302 which may also be included in a test.

A power monitor 303 may monitor the power consumed by a hardware component 301 during the course of a test. The power monitor 303 may be an Internet Protocol power distribution unit (PDU) which supports Simple Network Management Protocol (SNMP) querying on a per socket basis.

A temperature monitor 304 may monitor the temperature of a hardware component 301 during the course of a test. The temperature monitor 304 may be an Internet Protocol based temperature sensor which may be automatically queried using SNMP or similar methods.

A monitoring system 310 may be provided as a separate component or integral to a test scheduling system 330.

The monitoring system 310 may include a test monitor 320 including a power monitor receiver 321 for receiving information from one or more power monitors 303 monitoring hardware components 301 used during a test. The test monitor 320 may also include a temperature monitor receiver 322 for receiving information from one or more temperature monitors 304 monitoring hardware components 301 used during a test.

The test monitor 320 may also include an outcome score component 323 for determining a measure of successful outcome of a test. For example, this may be in the form of a defect exposure counter for counting defects exposed by a test. A defect exposure counter may maintain an average count over multiple instances of the same test being carried out. Defects that are exposed may be tracked in a database system which is updated by the tester running the test when a defect is encountered. As another example, the outcome score component 323 may be a timer for speed of execution of a test. The outcome score component 323 may combine more than one measure of successful outcome of a test, for example, by measuring the defect exposure and speed of execution.

The monitoring system 310 may include an environment signature generator 311 which uses the monitored temperature and power during a test to generate a signature for a particular test. A separate signature may be generated for the same test carried out on different hardware or software. For example, if a different software version is used on the same hardware, a new test signature may be generated. If software is updated, then a test signature may be overwritten and updated.

A signature and outcome score store 312 may store test signatures and associated data on the outcome of the test.

A test scheduling system 330 may include a resource status component 340 for gathering information about the status of resources that may be used during a test, or affected by a test being carried out. The resource status component 340 may a include current status component 341 for determining a current status of resources, and may also include a future or timed resource status component 342 for estimating the usage of resources at a particular time in the future.

The test scheduling system 330 may include a time slot component 331 for determining a time at which a test is to be carried out and a test selection component 332 for selecting a test based on the stored signature and defect exposure information for the time slot.

Figure 4:
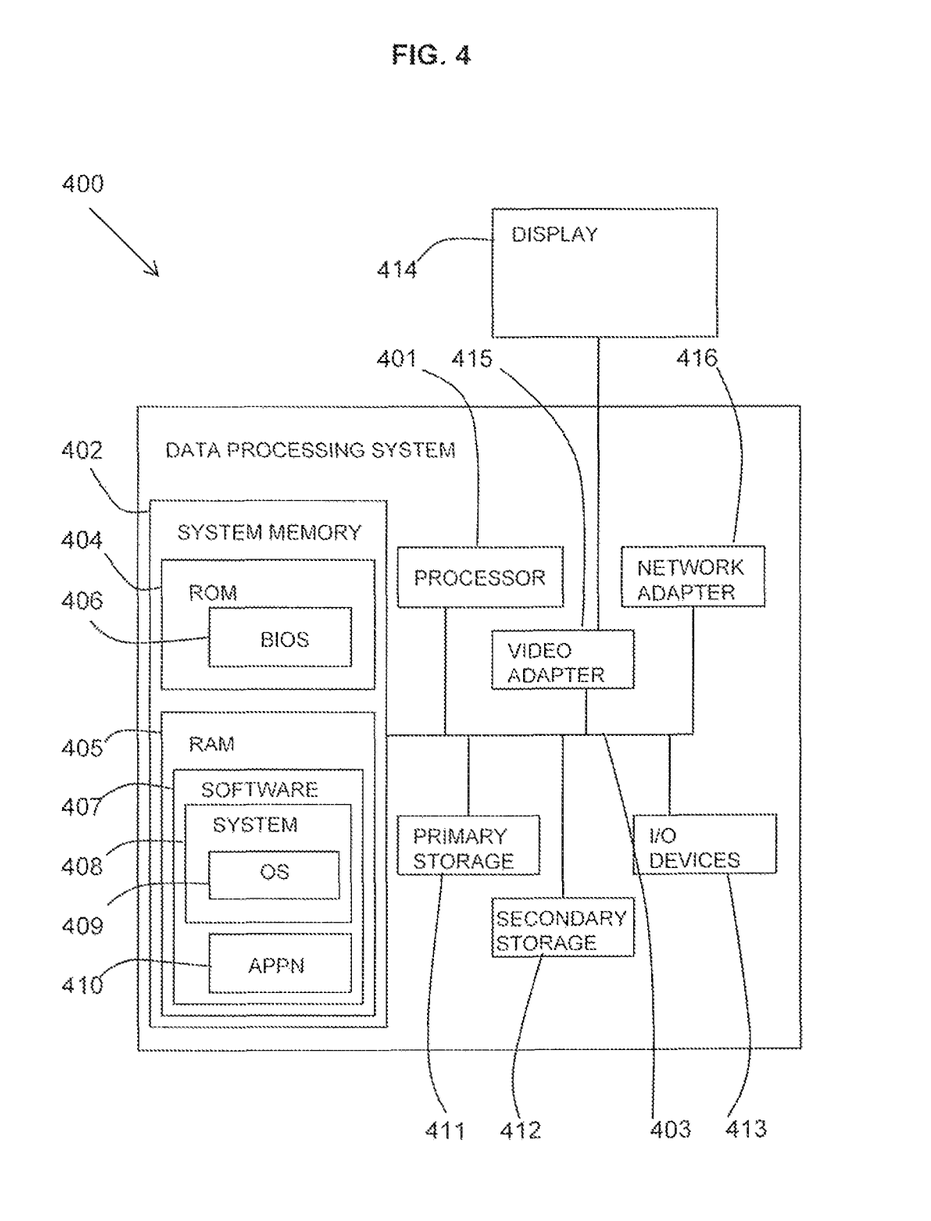
FIG. 4 is a block diagram of an embodiment of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer-implemented method for using environmental signatures for test scheduling comprising:
    generating an environmental signature for a test including the usage of power and temperature of one or more hardware components being tested, wherein generating an environmental signature for a test including the usage of power and temperature of one or more hardware components being tested includes:
monitoring the usage of power by one or more hardware components during the course of the test;
monitoring the temperature of one or more hardware components during the course of the test;
determining a temperature delta based on the difference between the temperature during the course of the test and an initial temperature; and
generating a signature representing the power usage during the test and the temperature delta;
determining an outcome score of the test, wherein determining an outcome score of the test includes determining the number of defects exposed by the test and basing the outcome score on the number of defects exposed; and
scheduling one or more tests on hardware components based on the environmental signature and outcome score of candidate tests, wherein scheduling one or more tests on hardware components based on the environmental signature and outcome score of candidate tests includes assessing the relative merit of running one of the candidate tests over another of the candidate tests based on the environmental signature and the number of defects exposed by each of the candidate tests, and wherein the environmental signature provides the ability to decide which test to run based on the amount of resources consumed versus relative effectiveness at exposing defects.

2. The method as claimed in claim 1, wherein generating a signature includes weighting the power usage and the temperature delta based on the importance of these aspects.

3. The method as claimed in claim 1, wherein determining an outcome score of the test includes:
determining a speed of execution of the test and basing the outcome score on the speed of execution.

4. The method as claimed in claim 1, wherein a test is a test of a combination of one or more hardware components and one or more software components.

5. The method as claimed in claim 1, wherein a test is a test phase including multiple tests grouped together.

6. The method as claimed in claim 1, including:
providing a definition of a test including test parameters for which a test signature is generated and stored.

7. The method as claimed in claim 1, including:
updating a test signature for a test when a software component is updated to a new version.

8. The method as claimed in claim 1, wherein generating an environmental signature for a test and determining an outcome score of the test include repeating the test multiple times and averaging the results.

9. The method as claimed in claim 1, wherein scheduling one or more tests on hardware components based on the environmental signature and outcome score of candidate tests includes:
determining resource and/or environmental status for the scheduled time of a test;
selecting a test from multiple candidate tests optimised for the resource and environmental status.

10. The method as claimed in claim 9, wherein scheduling one or more tests on hardware components based on the environmental signature and outcome score of candidate tests includes:
determining resource and/or environmental status for a time period before or after a test;
selecting a test that best compliments the resource and/or environmental status.

11. The method as claimed in claim 1, wherein scheduling one or more tests on hardware components based on the environmental signature and outcome score of candidate tests includes comparing defects exposed per watt of energy consumed.

12. A system for using environmental signatures for test scheduling, comprising:
a memory;
at least one processor coupled to the memory, and operative to:
generate, in a monitoring system, an environmental signature for a test including the usage of power and temperature of one or more hardware components being tested, wherein the monitoring system includes:
a power monitor receiver for monitoring the usage of power by one or more hardware components during the course of the test;
a temperature monitor receiver for monitoring the temperature of one or more hardware components during the course of the test; and
an environment signature generating component for determining a temperature delta based on the difference between the temperature during the course of the test and an initial temperature and generating a signature representing the power usage during the test and the temperature delta, wherein the environment signature generating component includes weighting the power usage and temperature based on the importance of these aspects;
determine, in an outcome score component, an outcome score of the test, wherein the outcome score component for determining an outcome score of the test includes an exposed defect counter for determining the number of defects exposed by a test and basing the outcome score on the number of defects exposed; and
schedule, in a test scheduling system, one or more tests on hardware components based on the outcome score and the environmental signature for each of a plurality of candidate tests, wherein to schedule one or more tests on hardware components based on the outcome score and the environmental signature for each of a plurality of candidate tests includes assessing the relative merit of running one of the candidate tests over another of the candidate tests based on the environmental signature and the number of defects exposed by each of the candidate tests, and wherein the environmental signature provides the ability to decide which test to run based on the amount of resources consumed versus relative effectiveness at exposing defects.

13. The system as claimed in claim 12, wherein the environment signature generating component includes weighting the power usage and the temperature delta based on the importance of these aspects.

14. The system as claimed in claim 12, wherein the outcome score component for determining an outcome score of the test includes:
a timer for determining a speed of execution of the test and basing the outcome score on the speed of execution.

15. The system as claimed in claim 12, wherein the test scheduling system includes:
a resource status component for determining resource and/or environmental status for the scheduled time of a test; and
a test selection component for selecting a test from multiple candidate tests optimised for the resource and environmental status.

16. The system as claimed in claim 15, wherein the resource status component is for determining resource and/or environmental status for a time period before or after a test; and wherein the test selection is for selecting a test that best compliments the resource and/or environmental status.

17. The system as claimed in claim 12, wherein to schedule one or more tests on hardware components based on the outcome score and the environmental signature for each of a plurality of candidate tests includes comparing defects exposed per watt of energy consumed.

18. A computer program product for using environmental signatures for test scheduling, the computer program product comprising a non-transitory computer readable storage medium having computer-readable program code embodied therewith, the computer-readable program code configured to:
  generate an environmental signature for a test including the usage of power and temperature of one or more hardware components being tested, wherein to generate an environmental signature for a test including the usage of power and temperature of one or more hardware components being tested the computer-readable program code is configured to:
  monitor the usage of power by one or more hardware components during the course of the test;
  monitor the temperature of one or more hardware components during the course of the test;
  determine a temperature delta based on the difference between the temperature during the course of the test and an initial temperature; and
  generate a signature representing the power usage during the test and the temperature delta;
  determine an outcome score of the test, wherein to determine an outcome score of the test includes determining the number of defects exposed by the test and basing the outcome score on the number of defects exposed; and
  schedule one or more tests on hardware components based on the outcome score and the environmental signature for each of a plurality of candidate tests, wherein to schedule one or more tests on hardware components based on the outcome score and the environmental signature for each of a plurality of candidate tests includes assessing the relative merit of running one of the candidate tests over another of the candidate tests based on the environmental signature and the number of defects exposed by each of the candidate tests, and wherein the environmental signature provides the ability to decide which test to run based on the amount of resources consumed versus relative effectiveness at exposing defects.

19. The computer program product as claimed in claim 18, wherein to schedule one or more tests on hardware components based on the outcome score and the environmental signature for each of a plurality of candidate tests includes comparing defects exposed per watt of energy consumed.

* * * * *